Aug. 5, 1941.　　　C. S. ASH　　　2,251,538
DUAL WHEEL VEHICLE
Filed Sept. 13, 1938　　　5 Sheets-Sheet 1

INVENTOR
Charles S. Ash
BY
Morgan Finnegan & Durham
ATTORNEYS

Patented Aug. 5, 1941

2,251,538

UNITED STATES PATENT OFFICE 2,251,538

DUAL WHEEL VEHICLE

Charles S. Ash, Milford, Mich.

Application September 13, 1938, Serial No. 229,698

6 Claims. (Cl. 301—6)

The invention relates to new and useful improvements in dual wheel assemblies and more particularly to such improvements in freely mounted assemblies, whether driven or not, and which employ differential gear means connecting the dual wheels and the braking means.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Figure 1:
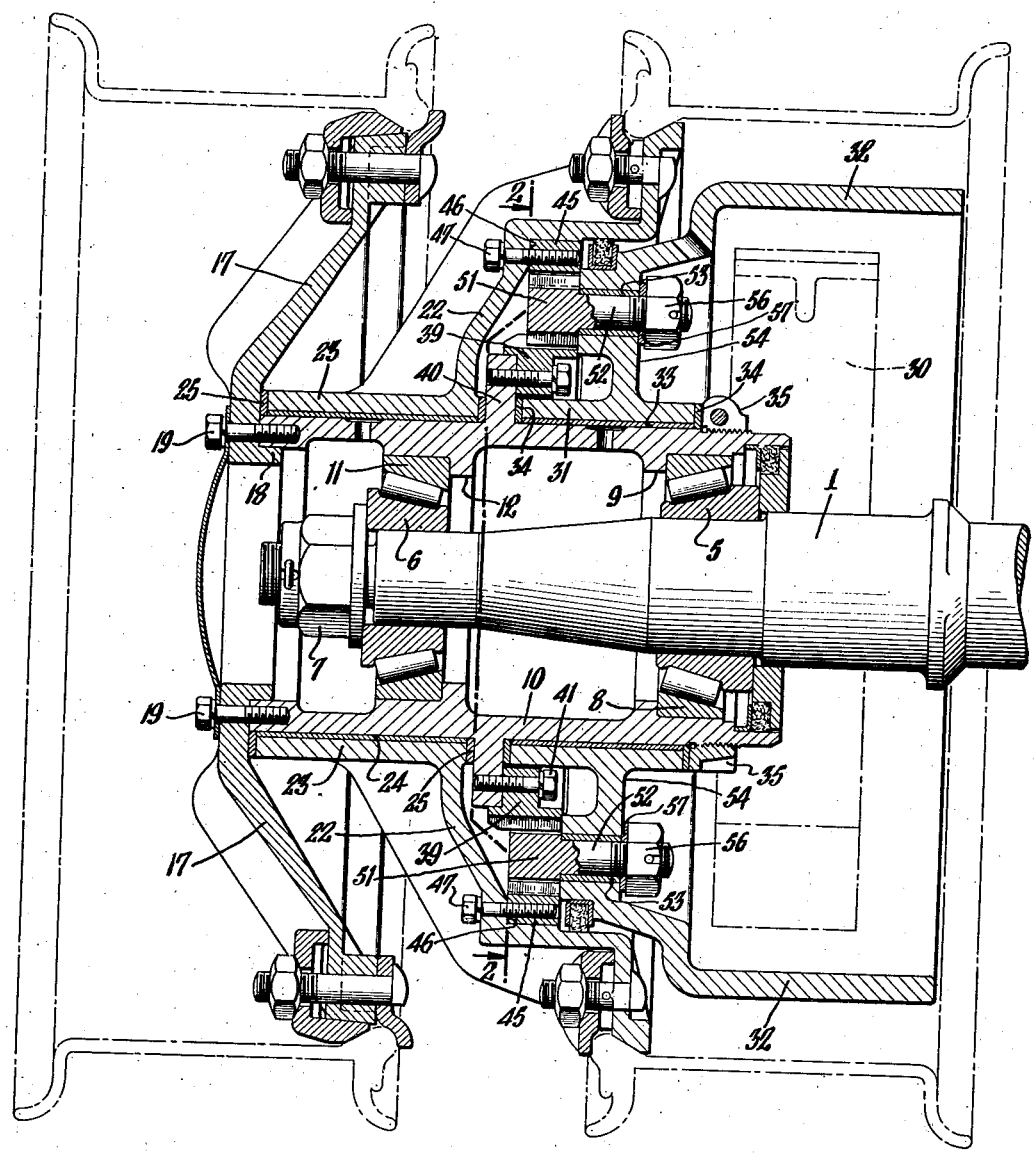
Fig. 1 is a central section through a dual assembly embodying the invention.

Objects of the invention are to provide novel and useful dual wheel assemblies wherein the side-by-side wheels are freely rotatable on an axle and are connected to each other and to a brake mechanism by differential gear mechanism, and may be either trailing wheels or driving wheels for the automotive vehicle; to provide such assemblies constructed and capacitated to efficiently and adequately meet all the varied and heavy demands of general road service of heavy-duty vehicles; to provide such assemblies of strong, simple and compact structure, and having strong and ample bearings adequate for heavy-duty service; to provide such assemblies having efficient equalization for differences in wheel travel due to variations in road surfaces, and to different paths of inboard and outboard wheels, having efficient equalization of braking action, and having also equalized distribution and application of driving torque when employed as traction assemblies, and to provide safe and reliable propulsion with safeguards against skidding.

With these and other objects in view, the present preferred embodiment, herewith exemplarily disclosed, comprises dual side-by-side wheels and a brake drum rotatable relatively to the wheels, all interconnected by differential gearing, and all journaled to rotate freely on a single bearing mounted on the vehicle axle. As here embodied, a large and spacious antifriction bearing is mounted on the axle, and journaled thereon is an elongated hub, the outer wheel being fixed to the hub and so mechanically integral therewith. The inner wheel has its hub journaled on the hub of the outer wheel, and the brake drum has a hub likewise journaled on the elongated hub of the outer wheel. One gear ring of the differential gear is fixed to the hub, and thus to the outer wheel, another gear ring is fixed to the inner wheel, and pinions meshing with both the gear rings are rotatably mounted on the independently rotatable brake drum to rotate with the drum. The differential gearing is shown as comprising an internal and an external gear ring of different diameters, fixed to the two wheels, respectively, and interposed between and intermeshing therewith are spur pinions rotatably mounted on the brake drum. With this structure, a greater braking force is applied to the inner wheel than to the outer wheel, thus making it impossible to skid both wheels at the same time. The differential gearing is also shown as two crown gears of equal diameter, one fixed to either wheel and bevel pinions intermeshing with both crown gears, the pinions being rotatably mounted on the brake drum. With this form the braking force is transmitted equally to both wheels. This embodied assembly is shown as trailing or free rolling, and is also shown as a traction unit applicable to automotive vehicles in which sprocket chain drives are used, such as are employed in many heavy-duty trucks. It will be understood that the foregoing general description and the following detail description as well, are exemplary and explanatory but are not restrictive of the invention.

Referring now in detail to the embodiment of the invention illustrated by way of example in the accompanying drawings, an axle 1 of a motor vehicle is shown carrying a pair of antifriction roller bearings. The internal raceway 5 of the inboard bearing abuts at its inner side on a shoulder on the axle, and the internal raceway 6 of the outboard bearing at its outer side abuts on and is held in place by a lock-nut 7 screw-threaded and secured on the end of the axle. The outside raceway 8 of the inboard bearing abuts on its outer side on an inwardly-projecting annular flange 9, formed on the interior of a large hub 10, and the outside raceway 11 of the outboard bearing abuts on its inner side on an inwardly-projecting annular ring 12 likewise formed on the interior of the hub 10. The outboard wheel 17 is fixed to the outer flat circular face of the hub 10, the wheel being shown centrally apertured with an inwardly-projecting annular flange 18 fitting tightly within the bore of the hub 10. The wheel is fixed to the hub 10 by screw-bolts 19, passing through the wheel web and screw-threaded into the end of the hub, the wheel and the hub being thus mechanically integral. Journaled on the outer part of hub 10, just within the web of outboard wheel 17 is the hub 23 of the inboard wheel 22, with a cylindrical bushing 24 interposed between the two hubs and with anti-friction ring washers 25 at either end of the bushing. Journaled on the inner portion of the hub 10 is the hub 31 of a brake drum 32, with an anti-friction bushing 33 interposed between the hubs and anti-friction ring washers 34 at either end of the bushing. A brake shoe device is indicated at 30. A lock nut 35 is screw-threaded onto the inner end of the hub 10, and maintains the rotatable brake drum in place longitudinally on the hub 10.

Figure 2:
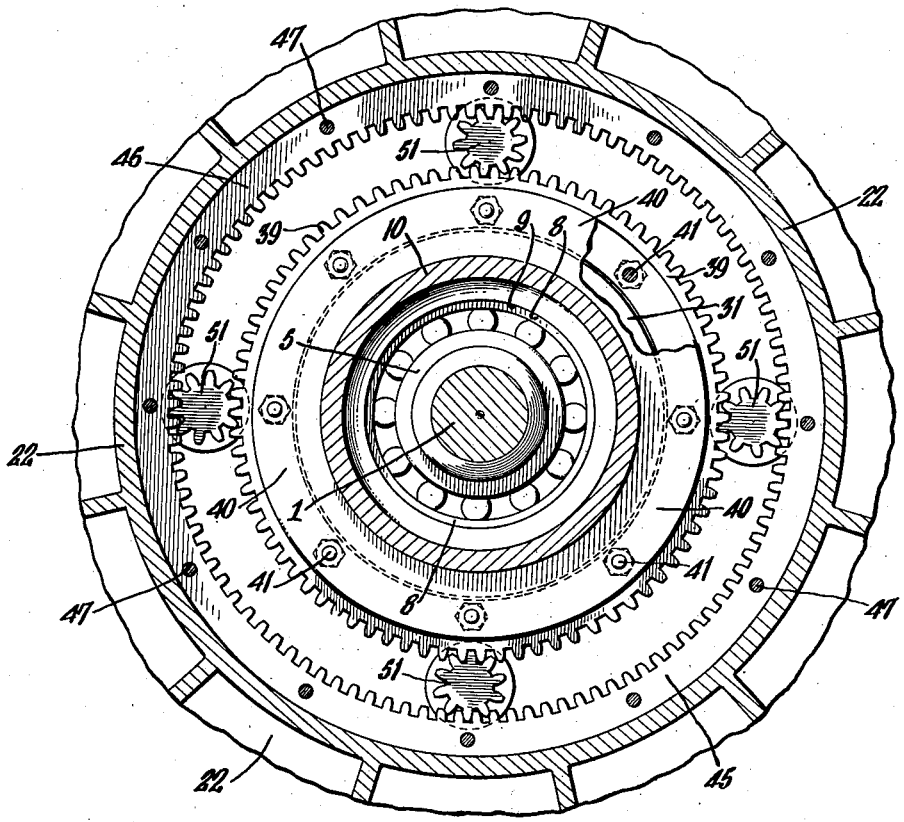
Fig. 2 is a full section on line 2—2 of Fig. 1.

The differential gear connection for the two independently rotatable wheels and the independently rotatable brake drum comprises (Figs. 1 and 2) an external gear ring 39, fixed to the hub 10 and thus to the outboard wheel 17. Ring 39 is undercut annularly so as to rest both upon the periphery and the flat inner face of an annular, outwardly-projecting flange 40, formed on the exterior of the hub 10, and located between the hub of the inboard wheel 22 and the hub of the brake drum 32. This gear ring 39 is fixed to the flange 40 by screw bolts 41. An internal gear ring 45, of larger diameter than said external gear ring, is fixed to the inboard wheel 22. The gear ring is nested in an annular seat 46 formed on the inner face of the inboard wheel 22, the gear ring being fixed to the wheel by screw bolts 47. A plurality of planetary pinions mesh with both gear rings, the pinions being rotatably journaled on the brake drum and also rotate with the brake drum. As embodied, intermeshing with both gear rings 39 and 45 are a plurality of pinions 51 shown as four in number, which are integral with stub shafts 52, these shafts being rotatably mounted, with bushings 53 interposed, in the flat end face 54 of the brake drum 32. The stub shafts are rotatably held in their bearings by lock nuts 56, having interposed anti-friction washers 57.

Figure 5:
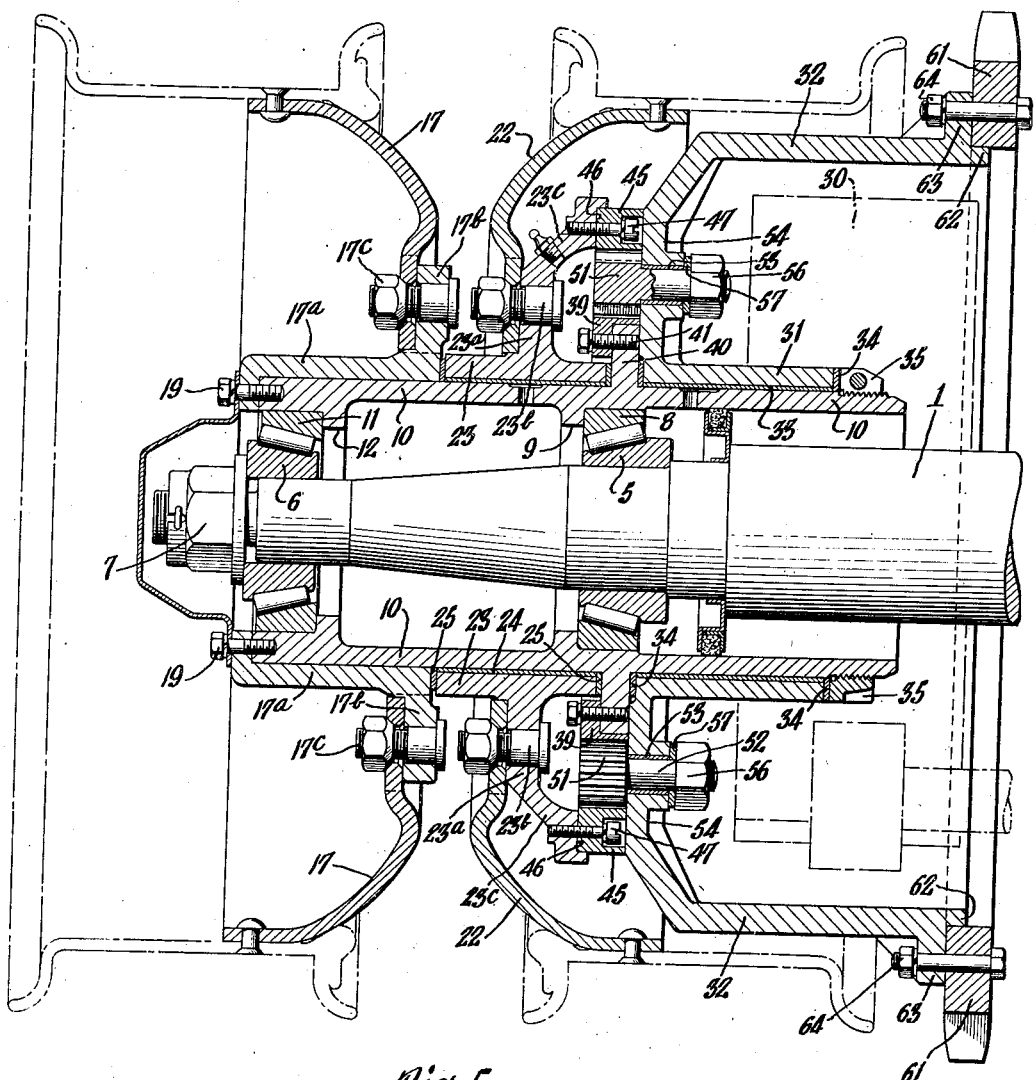
Fig. 5 is a section similar to Figs. 1 and 3 but showing a sprocket drive from the motor to the brake drum.

In Fig. 5 the same structure as that just described is shown, with certain changes in design, but with the drive from the motor applied to the assembly, thereby making it a traction or driving assembly. In the automotive drive, as here embodied, a sprocket ring 61 is fixed to the inner end of brake drum 32, the inner annular face of the sprocket ring fitting externally about an annular flange 62 formed on the brake drum, and the outer flat side of the sprocket ring resting against the inner flat face of an annular flange 63 projecting outwardly from the periphery of the brake drum 32, the sprocket ring 61 and brake drum 32 being fastened together by bolts 64. The drive from the vehicle motor onto the sprocket ring 61 may be of any known or other suitable form.

The changes in form shown in Fig. 5 represent facilities, advantages and economies in manufacturing and increased strength in operation. The outboard wheel 17 is shown having a cylindrical reinforcing hub 17ª tightly fitting about the outer end of hub 10, and having an inwardly-extending flange abutting on the end of hub 10 and fixed thereto by screw-bolts 19. This reinforcing hub 17ª has at its inner end an outwardly-extending annular flange 17ᵇ. In this form it is convenient to use interchangeable, demountable-at-the-hub type of disc wheels, as shown in Fig. 5. The disc wheels are reversible and interchangeable, and are designed for great strength for a given weight of metal. The central opening in the web of wheel 17 fits over the reinforcing hub, abuts on the flat face of annular flange 17ᵇ and is fixed thereto by bolts 17ᶜ. As to the inboard wheel, the hub 23 has integral therewith an outwardly extending annular flange 23ª to which a reversible and interchangeable wheel web is fixed. The interior opening of the wheel web fits tightly on the hub 23, and abuts on the outer face of flange 23ª and is fixed thereto by bolts 23ᵇ. In this form the internal gear ring 45 is seated in and bolted to an integral, dished annular extension 23ᶜ of the hub flange 23ª.

Figure 3:
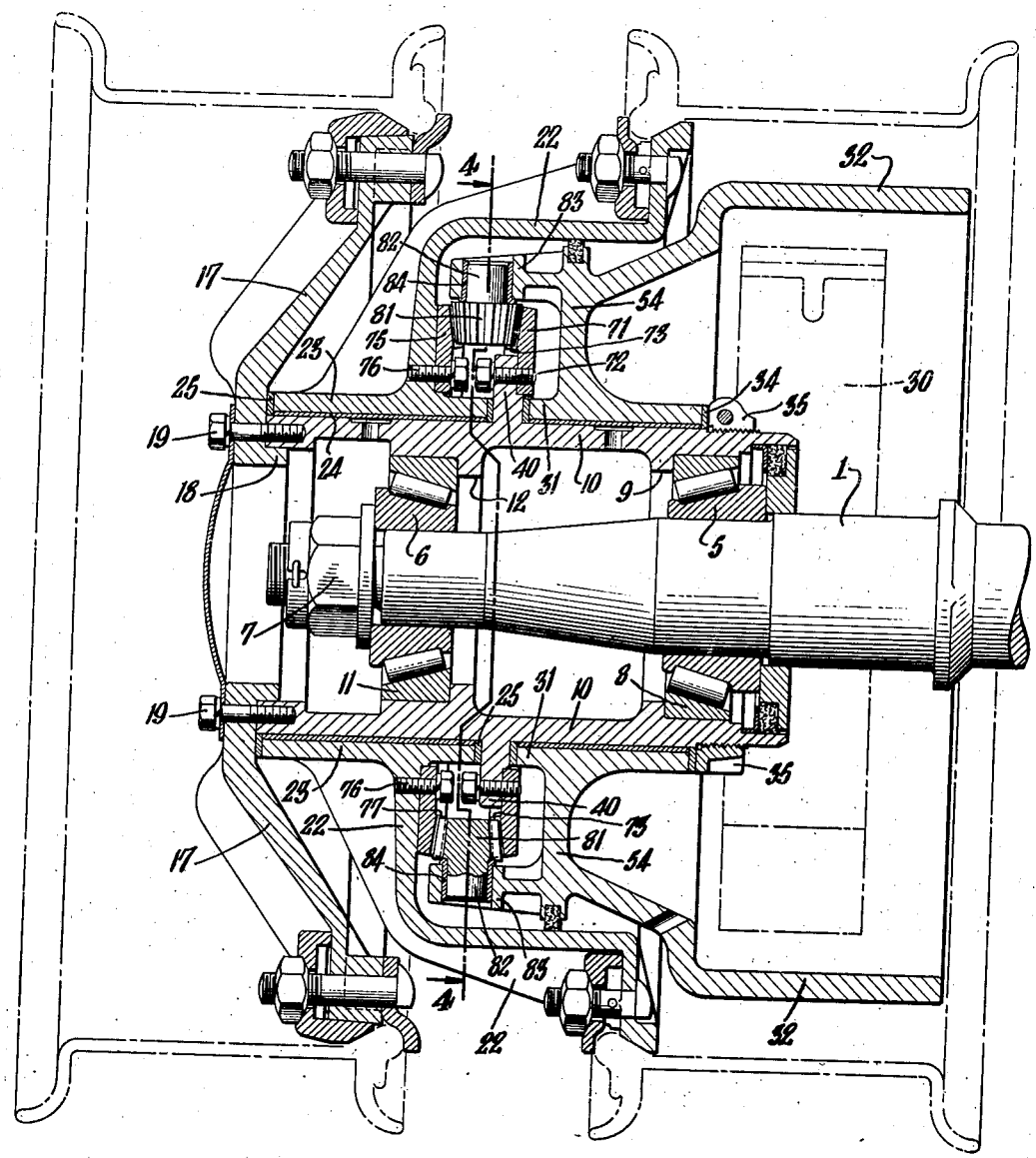
Fig. 3 is a central section through a somewhat different form of dual assembly.
Figure 4:
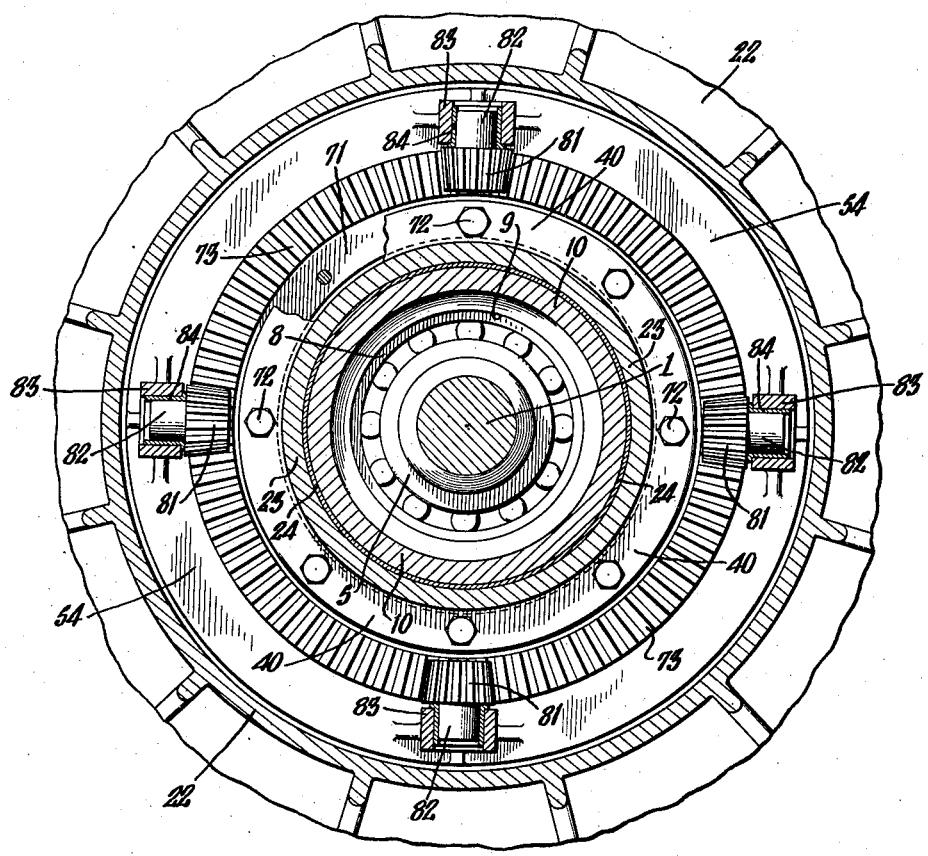
Fig. 4 is a full section on line 4—4 of Fig. 3.

In Figs. 3 and 4 a different form of the differential gear connections for the freely rotatable wheels and the independently rotatable brake drum is shown. The main features of the assembly structure are the same as those shown in Fig. 1, and the same reference numerals are applied to the same parts, which need not be again described. Referring to the differential gear connections as shown in Figs. 3 and 4, a flat ring or annular plate 71 has its inner annular surface and a flat side seated in correspondingly formed parts on the inner side of the annular flange 40, which is integral with the hub 10, as previously described, the gear ring 71 being fixed to supporting flange 40 by screw-bolts 72. Formed on the outer portion of the ring 71 is a crown bevel gear 73. A like gear ring 75 has its inner annular face and its outer flat side seated in correspondingly formed parts on the inner face of the web of the inboard wheel 22, the gear ring 75 being fixed to the inboard wheel 22 by screw bolts 76. The ring 75 has a crown bevel gear 77 formed thereon, of the same diameter as the facing, corresponding bevel crown gear 73, which is fixed to the hub 10 and thus to the outboard wheel. Meshing with both the gear rings 73 and 77 are a plurality of bevel pinions 81, integral with which are stub shafts 82, the shafts being journaled in lugs 83, formed on and integral with the flat back plate of the brake drum 32, with anti-friction bushings 84 interposed.

As a trailing unit, in ordinary road operation, the two wheels and the brake drum rotate together, and if inequalities in road surfaces cause unequal rotation of the wheels, this will be permitted by the differential gearing, with corresonding idle rotation of the brake drum. Substantially, the same action occurs in compensating for the difference in lengths of paths of travel of the inboard and outboard wheels in turning. When the brake is applied, the normal tendency is to retard both wheels with the brake drum as a unit, responsive and proportional to the pressure of a brake shoe. In the form employing the internal and external gear rings with the interposed, intermeshing spur pinions, there is a greater braking retardation exerted on the inner wheel than on the outer wheel, and this makes for safety as it is thus impossible to skid both these wheels at the same time. In this case also, relative movement between the wheels, due to road surface conditions, unequal pressure, or other causes will be permitted with corresponding compensating rotational movement of the brake drum, the main normal effect, however, being to exert equal retardation on both wheels, responsive to the braking pressure. Where the assembly is driven from the vehicle motor, the driving torque is applied to the brake drum, and the usual effect is to rotate the drum and both wheels as a unit. With this form, the driving force and braking force are both transmitted to the independently rotatable wheels through the one and same differential, as shown. However, as in the previous cases, differences in the rotation of the wheel arising out of road inequalities or differences in length of travel path will be compensated for in the manner previously described.

The invention in its broader aspects is not limited to the specific mechanisms shown and described but departures may be made therefrom within the scope of the accompanying claims without departing from the principles of the invention and without sacrificing its chief advantages.

What I claim is:

1. A hub adapted to be rotatably mounted on an axle, dual wheels, one of said wheels being fixed to said hub, the other of said wheels being rotatably mounted on said hub, a brake drum rotatable relatively to said wheel, a gear member fixed to said hub, a gear member fixed to the wheel which is rotatably mounted on the hub, and a gear member mounted to rotate with said brake drum, said last gear member meshing with the other two gear members.

2. A hub adapted to be rotatably mounted on an axle, dual wheels, one of said wheels being fixed to said hub, the other of said wheels being rotatably mounted on said hub, a brake drum rotatably mounted on said hub, an external gear ring fixed to said hub, an internal gear ring of greater diameter than said external gear ring, fixed to the wheel which is rotatably mounted on the hub, and a pinion mounted to rotate with said drum and meshing with both said gear rings.

3. A vehicular dual wheel assembly including in combination a hub adapted to be rotatably mounted on an axle, dual wheels, one of said wheels being fixed to said hub, the other of said wheels being rotatably mounted on said hub, a brake drum, a crown gear fixed to said hub, a crown gear fixed to the wheel which is rotatably mounted on the hub, and a pinion mounted to rotate with the brake drum and meshing with both said crown gears.

4. A vehicular dual wheel assembly including in combination a hub adapted to be rotatably mounted on an axle, dual wheels, one of said wheels being fixed to said hub, the other of said wheels being rotatably mounted on said hub, a brake drum rotatably mounted relatively to said wheels, a crown gear fixed to said hub, a crown gear fixed to the wheel which is rotatably mounted on the hub, and a pinion mounted to rotate with the brake drum and meshing with both said crown gears.

5. A dual wheel drive for an automotive vehicle including in combination dual wheel members adapted to be freely rotatably mounted side-by-side about an axle, a braking member including a brake drum rotatable relatively to said wheels, a gear member fixed to rotate with one of said wheels, a gear member fixed to rotate with the other of said wheels, a gear member mounted to rotate with said brake drum, said last gear member meshing with the other two gears.

6. A dual wheel drive for an automotive vehicle including in combination dual wheels adapted to be rotatably mounted side-by-side about an axle, a brake drum rotatably mounted about the axle and rotatable relatively to the wheels, a sprocket gear fixed to said brake drum and adapted to receive a chain drive from the vehicle motor, a gear ring fixed to rotate with one of said wheels, a gear ring fixed to rotate with the other of said wheels, and a pinion mounted to rotate with said brake drum and meshing with both of said gear rings, the motor drive and brake retardation being transmitted to the wheels through said gearing.

CHARLES S. ASH.